(12) United States Patent
Inomata et al.

(10) Patent No.: US 9,296,177 B2
(45) Date of Patent: Mar. 29, 2016

(54) OPTICAL LAYERED BODY, POLARIZER, AND IMAGE DISPLAY DEVICE

(75) Inventors: Yuya Inomata, Tokyo (JP); Tomoyuki Horio, Tokyo (JP); Takeshi Nishizono, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 208 days.

(21) Appl. No.: 13/819,278

(22) PCT Filed: Aug. 24, 2011

(86) PCT No.: PCT/JP2011/069068
§ 371 (c)(1),
(2), (4) Date: May 8, 2013

(87) PCT Pub. No.: WO2012/026497
PCT Pub. Date: Mar. 1, 2012

(65) Prior Publication Data
US 2013/0222907 A1    Aug. 29, 2013

(30) Foreign Application Priority Data
Aug. 27, 2010   (JP) .................................. 2010-191193

(51) Int. Cl.
*B32B 7/02*      (2006.01)
*B32B 23/08*     (2006.01)
(Continued)

(52) U.S. Cl.
CPC . *B32B 7/02* (2013.01); *B32B 23/08* (2013.01); *G02B 1/105* (2013.01); *G02B 5/30* (2013.01);
(Continued)

(58) Field of Classification Search
CPC ............ G02B 1/10; G02B 1/105; G02B 1/12; B32B 27/32; B05D 5/06
USPC ........................ 359/483.01; 427/164; 428/217
See application file for complete search history.

(56) References Cited

U.S. PATENT DOCUMENTS

| 2006/0181774 A1* | 8/2006 | Ojima et al. ................... 359/586 |
| 2009/0075074 A1 | 3/2009 | Horio et al. |
| 2010/0020398 A1 | 1/2010 | Horio et al. |

FOREIGN PATENT DOCUMENTS

| CN | 101454692 A | 6/2009 |
| CN | 101738650 A | 6/2010 |

(Continued)

OTHER PUBLICATIONS

Agilent Technologies, "Nanoindentation, Scratch, and Elevated Temperature Testing of Cellulose and PMMA Films," Application Note, http://cp.literature.agilent.com/litweb/pdf/5990-5761EN.pdf, Printed in USA, Apr. 16, 2010, Accessed Dec. 22, 2014.*
Chandler, Hardness Testing, 2nd edition, ASM International, 1999, pp. 80-86.*

*Primary Examiner* — Stephone B Allen
*Assistant Examiner* — Adam W Booher
(74) *Attorney, Agent, or Firm* — Hamre, Schumann, Mueller & Larson, P.C.

(57) ABSTRACT

An optical layered body that can reduce the occurrence of curling and has excellent workability when being affixed to a polarizing element or a display panel is provided. In particular is provided an optical layered body having a hard coat layer on one side of a triacetylcellulose substrate, wherein a Martens hardness (N1) of the surface of the hard coat layer, a Martens hardness (N2) of the center of the cross-section of the hard coat layer, and a Martens hardness (N3) of the center of the cross-section of a triacetylcellulose substrate as measured by nanoindentation at a load of 10 mN are as follows: the Martens hardness (N1) is 200 to 450 N/mm$^2$; the Martens hardness (N2) is 100 to 300 N/mm$^2$; and the Martens hardness (N3) is 150 to 250 N/mm$^2$.

20 Claims, 2 Drawing Sheets

(51) Int. Cl.
*G02B 5/30* (2006.01)
*G02F 1/1335* (2006.01)
*G02B 1/10* (2015.01)

(52) U.S. Cl.
CPC ........ *G02B 5/3025* (2013.01); *G02F 1/133528* (2013.01); *G02B 5/3033* (2013.01); *G02F 2201/50* (2013.01); *Y10T 428/24983* (2015.01)

(56) References Cited

FOREIGN PATENT DOCUMENTS

| | | |
|---|---|---|
| JP | 2008-107762 A | 5/2008 |
| JP | 2009-086660 A | 4/2009 |
| JP | 2009-186760 A | 8/2009 |
| JP | 2009262148 A | 11/2009 |
| JP | 2010-097173 A | 4/2010 |

* cited by examiner

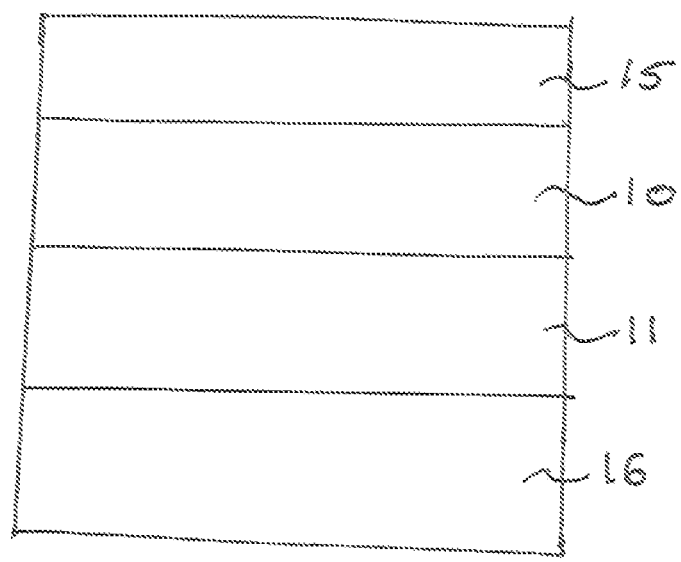

ically, the present inventors found that the occurrence of curling can be suitably prevented even when the hard coat layer is formed in a single-layered structure and the triacetylcellulose substrate is made thin, as long as the values of the hardness of the layers constituting the optical layered body, particularly, the Martens hardness of the surface of the hard coat layer, the
OPTICAL LAYERED BODY, POLARIZER, AND IMAGE DISPLAY DEVICE

CROSS REFERENCE TO RELATED APPLICATIONS

This application is a National Phase filing under 35 U.S.C. §371 of PCT/JP2011/069068 filed on Aug. 24, 2011; and this application claims priority to Application No. 2010-191193 filed in Japan on Aug. 27, 2010, under 35 U.S.C. §119; the entire contents of all are hereby incorporated by reference.

TECHNICAL FIELD

The present invention relates to an optical layered body, a polarizer, and an image display device.

BACKGROUND ART

Image display devices such as cathode-ray tube (CRT) display devices, liquid crystal displays (LCDs), plasma display panels (PDPs), electroluminescence displays (ELDs), field emission displays (FEDs), touch panels, electronic paper, and tablet PCs are required to be provided with abrasion resistance in order to prevent damage during handling.

In response to such request, a hard coat film having a hard coat (HC) layer on a substrate film, and a hard coat film provided with optical functions such as anti-reflection properties and anti-glare properties have been usually used to improve the abrasion resistance of the image display surfaces of these image display devices.

It is preferred that the hardness of the hard coat layer surface of the hard coat film be higher for the purpose of improving the abrasion resistance of image display surfaces of image display devices. Various methods have been examined for increasing the hardness of the hard coat layer surface. For example, there is a method in which inorganic particles are incorporated in the hard coat layer. Patent Literature 1, for example, discloses such a hard coat film, wherein an intermediate layer formed by curing a composition containing a photocurable resin and a thermosetting resin is provided on a transparent substrate, and a hard coat layer is provided on the intermediate layer so as to improve the hardness.

However, in the case of conventional hard coat films, warping (curling) of the entire hard coat film and deflection of the film occur as the hardness of a hard coat layer is increased. Consequently, when such a hard coat film is affixed to a polarizing element or a display panel, air may be trapped, causing inclusion of air bubbles; or a film may be inwardly rolled, significantly impairing the processability.

Further, there has been demand for thinner films in order to reduce the weight of hard coat films. However, it has been impossible to sufficiently reduce the thickness of a hard coat film having an intermediate layer and a hard coat layer. Therefore, there has been demand to improve the hardness of a hard coat layer having a single-layered structure and decrease the film thickness of a transparent substrate. However, in the case of such a hard coat film having a hard coat layer of a single-layered structure and a thin transparent substrate, an attempt to increase the hardness of the hard coat layer has created problems such as curling and heat wrinkles.

CITATION LIST

Patent Literature

Patent Literature 1: JP 2008-107762 A

SUMMARY OF INVENTION

Technical Problem

In view of the current situation described above, the present invention aims to provide an optical layered body having a hard coat layer of a single-layered structure, wherein the optical layered body has high hardness although the substrate thickness is thin; can reduce the occurrence of curling and heat wrinkles; and exhibits excellent workability when being affixed to a polarizing element or a display panel. The present invention also aims to provide a polarizer and an image display device manufactured using the optical layered body.

Solution to Problem

The present invention is an optical layered body comprising a hard coat layer formed on one side of a triacetylcellulose substrate, wherein the hard coat layer has a single-layered structure, and when a Martens hardness (N1) of a surface of the hard coat layer, a Martens hardness (N2) of the center of the cross-section of the hard coat layer, and a Martens hardness (N3) of the center of the cross-section of the triacetylcellulose substrate are measured by nanoindentation at a load of 10 mN, the Martens hardness (N1) is 200 to 450 N/mm², the Martens hardness (N2) is 150 to 300 N/mm², and the Martens hardness (N3) is 100 to 250 N/mm².

In the optical layered body of the present invention, the difference (N1−N2) between the Martens hardness (N1) and the Martens hardness (N2) is preferably 0 to 150 N/mm², and the difference (N2−N3) between the Martens hardness (N2) and the Martens hardness (N3) is preferably 0 to 150 N/mm².

The hardness of the surface of the hard coat layer as determined by a pencil hardness test (load of 4.9 N) is preferably 3H or more.

The hard coat layer is formed using a hard coat layer-forming composition containing an ionizing radiation-curable resin and a photopolymerization initiator; and the ionizing radiation-curable resin preferably contains a urethane compound having 6 or more polymerizable functional groups or a polymer having 10 or more polymerizable functional groups, and a compound having 2 or more polymerizable functional groups.

The amount of the photopolymerization initiator contained in the hard coat layer-forming composition is preferably 1 to 10 parts by mass based on 100 parts by mass of the ionizing radiation-curable resin.

The present invention also provides a polarizer comprising a polarizing element and the above-described optical layered body which is arranged on a surface of the polarizing element.

The present invention also provides an image display device comprising the above-described optical layered body or the above-described polarizer on an outermost surface thereof.

The present invention is described in detail below.

The present inventors extensively studied an optical layered body having a hard coat layer of a single-layered structure formed on a triacetylcellulose substrate, and as a result, found that a balance of the hardness of each layer constituting the optical layered body is a key factor in suppressing the occurrence of curling on the optical layered body. Specifically, the present inventors found that the occurrence of curling can be suitably prevented even when the hard coat layer is formed in a single-layered structure and the triacetylcellulose substrate is made thin, as long as the values of the hardness of the layers constituting the optical layered body, particularly, the Martens hardness of the surface of the hard coat layer, the Martens hardness the center of the cross-section of the hard coat layer, and the Martens hardness of the center of the cross-section of the triacetylcellulose substrate, are in predetermined ranges. The present invention is accomplished based on the above finding.

In the optical layered body of the present invention, the hard coat layer has a single-layered structure; when a Martens hardness (N1) of a surface of the hard coat layer, a Martens hardness (N2) of the center of the cross-section of the hard coat layer, and a Martens hardness (N3) of the center of the cross-section of the triacetylcellulose substrate are measured by nanoindentation at a load of 10 mN, the Martens hardness (N1) is 200 to 450 N/mm$^2$, the Martens hardness (N2) is 150 to 300 N/mm$^2$, and the Martens hardness (N3) is 100 to 250 N/mm$^2$. Because these values (N1), (N2), and (N3) of the Martens hardness are in the above ranges, the optical layered body of the present invention can prevent the occurrence of curling.

A specific method for measuring the Martens hardness (N1) of the surface of the hard coat layer is as follows: for example, as shown in FIG. 1, a Vickers indenter 12, which is a square-based diamond pyramid with an angle of 136 degrees between the opposite faces, is pressed in a vertical direction into the surface of a hard coat layer 10 (the surface opposite the triacetylcellulose substrate), and the Martens hardness is determined from the resulting load-displacement curve. The Martens hardness is determined at five points, and the average is regarded as the Martens hardness (N1) of the surface of the hard coat layer. More specifically, the Martens hardness is determined as follows: the surface area A (mm$^2$) of a diamond-shaped depression 13a formed by pressing of the Vickers indenter is calculated from the diagonals of the depression, and a test load F (N) is divided by the surface area (F/A).

Further, the Martens hardness (N2) (the average of measurements at five points) of the center of the cross-section of the hard coat layer is determined in the same manner as in the N1 from depressions 13b formed by pressing the Vickers indenter 12 into the center (line A-A) on a cross-sectional surface 10a of the hard coat layer 10 in a vertical direction relative to the cross-sectional surface 10a. The Martens hardness (N3) (the average of measurements at five points) of the center of the cross-section of the triacetylcellulose substrate is determined in the same manner as in the N1 from depressions 13c formed by pressing the Vickers indenter 12 into the center (line B-B) on a cross-sectional surface 11a of a triacetylcellulose substrate 11 in a vertical direction relative to the cross-sectional surface 11a.

The measurement of the Martens hardness by nanoindentation can be carried out using Picodentor HM-500 produced by Fischer Instruments K.K.

In the case where the Martens hardness (N1) of the surface of the hard coat layer is less than 200 N/mm$^2$, the surface hardness of the optical layered body of the present invention does not reach the target pencil hardness of 3H, and the abrasion resistance is insufficient. On the other hand, in the case where the Martens hardness (N1) is more than 450 N/mm$^2$, the surface hardness becomes too hard instead and is thus brittle, resulting in reduced cracking properties (toughness). Additionally, curling becomes more severe, causing defects in the post-processing process (for example, curling becomes even more severe by saponification so that the optical layered body will not be able to flow through the production line or will be broken in some cases; curling occurs even after the optical layered body is affixed to a polarizer; etc.).

Further, the surface hardness of the optical layered body of the present invention does not reach the target pencil hardness of 3H.

A preferred lower limit of the Martens hardness (N1) is 210 N/mm$^2$, and a preferred upper limit is 400 N/mm$^2$. A more preferred lower limit is 230 N/mm$^2$, and a more preferred upper limit is 350 N/mm$^2$.

In the case where the Martens hardness (N2) of the center of the cross-section of the hard coat layer is less than 100 N/mm$^2$, the surface hardness of the optical layered body of the present invention does not reach the target pencil hardness of 3H. On the other hand, in the case where the Martens hardness (N2) is more than 300 N/mm$^2$, the surface hardness becomes too hard instead and is thus brittle, resulting in reduced cracking properties (toughness).

A preferred lower limit of the Martens hardness (N2) is 150 N/mm$^2$, and a preferred upper limit is 250 N/mm$^2$. A more preferred lower limit is 170 N/mm$^2$, and a more preferred upper limit is 240 N/mm$^2$.

Further, in the case where the Martens hardness (N3) of the center of the cross-section of the triacetylcellulose substrate is less than 150 N/mm$^2$, the surface hardness of the optical layered body of the present invention does not reach the target pencil hardness of 3H. On the other hand, in the case where the Martens hardness (N3) is more than 250 N/mm$^2$, the surface hardness becomes too hard instead and is thus brittle, resulting in reduced cracking properties (toughness). Additionally, heat damage (waviness of the film in the thickness direction) becomes more severe, resulting in a poor appearance after the optical layered body is affixed to a panel.

A preferred lower limit of the Martens hardness (N3) is 160 N/mm$^2$, and a preferred upper limit is 240 N/mm$^2$. A more preferred lower limit is 170 N/mm$^2$, and a more preferred upper limit is 230 N/mm$^2$.

Further, the optical layered body of the present invention is preferably such that the difference (N1−N2) between the Martens hardness (N1) and the Martens hardness (N2) is 0 to 150 N/mm$^2$, and the difference (N2−N3) between the Martens hardness (N2) and the Martens hardness (N3) is 0 to 150 N/mm$^2$. With the values of (N1−N2) and (N2−N3) being in the above described ranges, it is possible to more suitably prevent the occurrence of curling on the optical layered body of the present invention. A more preferred lower limit of the values of (N1−N2) and (N2−N3) is 5 N/mm$^2$, and a more preferred upper limit is 100 N/mm$^2$. With the values of (N1−N2) and (N2−N3) being in the above range, it is possible to uniformly suppress cross-linked curing shrinkage of each layer, and thus curling will not easily occur. In the optical layered body of the present invention, while only one value of either (N1−N2) or (N2−N3) needs to be in the above range, it is more preferred that both values of (N1−N2) and (N2−N3) be in the above range.

The surface of the hard coat layer preferably has a hardness of 3H or more as measured by a pencil hardness test (load of 4.9 N). A hardness of less than 3H imparts insufficient hard coat properties to the optical layered body of the present invention. The above pencil hardness test conforms to a pencil hardness test specified in JIS K5600-5-4 (1999).

As used herein, the hardness of the hard coat layer as measured by a pencil hardness test indicates the result evaluated based on the following criteria: out of five scratch tests, when the scratch leaves a mark having a length equal to or longer than 1/3 of the distance of the scratch, the result is regarded as unsatisfactory, and a hard coat layer with one or no unsatisfactory results is regarded as having passed the pencil hardness test. Specifically, in the case where a hard coat layer has one such scratch mark from five scratch tests, the result is expressed as 4/5 and considered as passing. In the case where a hard coat layer has four such scratch marks from five scratch tests, the result is expressed as 1/5 and considered as failing.

Hereinafter, the hard coat layer and the triacetylcellulose substrate of the optical layered body of the present invention having the above hardness are described.

The triacetylcellulose substrate has transparency smooth surface, heat resistance, and excellent mechanical strength.

The triacetylcellulose substrate preferably has a thickness of 10 to 65 μm, more preferably 20 to 45 μm.

In forming the hard coat layer on the triacetylcellulose substrate, the triacetylcellulose substrate may be previously subjected to physical or chemical treatment such as corona discharge treatment and oxidation treatment as well as application of an anchoring agent or a coating material called primer, in order to improve adhesion. Pre-saponification is also effective in preventing curling.

Pre-application of a later-described solvent to at least the side of the triacetylcellulose substrate opposite the side that will be in contact with the hard coat layer is also effective in preventing curling.

The hard coat layer is formed on the triacetylcellulose substrate, and contains a binder resin.

The binder resin is preferably transparent. A preferable example thereof is a binder resin formed using a hard coat layer-forming composition containing a photopolymerization initiator and an ionizing radiation-curable resin that is cured by ultraviolet light or electron beam.

As used herein, the term "resin" is a concept that includes resin components such as monomers and oligomers.

Examples of the ionizing radiation-curable resins include compounds having one or two or more unsaturated bonds, such as a compound having an acrylate-based functional group. Examples of compounds having one unsaturated bond include ethyl (meth)acrylate, ethylhexyl (meth)acrylate, styrene, methylstyrene, and N-vinylpyrrolidone. Examples of compounds having two or more unsaturated bonds include polyfunctional compounds such as polymethylolpropanetri (meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentylglycol di(meth)acrylate; and reaction products of these polyfunctional compounds with (meth)acrylate and the like (for example, poly(meth)acrylate esters of polyols). The above compounds modified by ethylene oxide, propylene oxide, caprolactone, isocyanuric acid, or the like may also be used. As used herein, the term "(meth)acrylate" includes both acrylate and methacrylate.

In addition to the above compounds, relatively low-molecular weight resins having an unsaturated double bond, polyester resins, polyether resins, acrylic resins, epoxy resins, urethane resins, alkyd resins, spiroacetal resins, polybutadiene resins, and polythiol-polyene resins can also be used as the above ionizing radiation-curable resins.

The ionizing radiation-curable resin preferably contains a urethane compound having 6 or more polymerizable functional groups or a polymer having 10 or more polymerizable functional groups, and a monomer having 2 or more polymerizable functional groups. The use of such a hard coat layer-forming composition containing such an ionizing radiation-curable resin having the above composition enables to suitably achieve a hard coat layer that satisfies the above-described relationship of the Martens hardness values of (N1), (N2), and (N3).

Herein, a hard coat layer-forming composition that contains silica for the purpose of, for example, increasing the hardness of a hard coat layer to be formed has been known. However, when a coating film is formed using such a hard coat layer-forming composition containing silica and the resulting coating film is dried, unfortunately, the silica tends to be present on the transparent substrate side, and the produced optical layered body has poor flexibility and is prone to cracking.

In contrast, in the case of the optical layered body of the present invention, the hard coat layer-forming composition does not contain silica but contains, as ionizing radiation-curable resin, the urethane compound having 6 or more polymerizable functional groups or the polymer having 10 or more polymerizable functional groups and the monomer having 2 or more polymerizable functional groups described above. When such a hard coat layer-forming composition is applied to the triacetylcellulose substrate to form a coating film, and the coating film is dried, somehow the urethane compound having 6 or more polymerizable functional groups or the polymer having 10 or more polymerizable functional groups will be present in a greater amount on the side of the coating film opposite the triacetylcellulose substrate (hereinafter also referred to as the upper layer of the coating film), and the monomer having 2 or more polymerizable functional groups will be present in a greater amount on the triacetylcellulose substrate side of the coating film (hereinafter also referred to as the lower layer of the coating film). When a penetrating solvent (described later) is used in such a coating film, it causes penetration of the monomer having 2 or more polymerizable functional groups present in a greater amount in the lower layer of the coating film into the triacetylcellulose substrate. A hard coat layer that satisfies the above-described relationship of the Martens hardness values of (N1), (N2), and (N3) can be formed by curing the above coating film. Because the entire coating film can be sufficiently cured, curling of the optical layered body can be controlled. Further, because the coating film is cured by ultraviolet irradiation, a hard coat layer having sufficiently high hardness can be obtained.

In the case where the monomer having 2 or more polymerizable functional groups is present in a greater amount in the upper layer of the coating film, when curing of the coating film begins, the monomer having 2 or more polymerizable functional groups may react too rapidly, failing to cure the inner part of the coating film and resulting in a hard coat layer with insufficient hardness. Further, the cross-linked curing shrinkage may be large because the upper layer of the coating film is easily cured, thus increasing the size of the curl of the resulting optical layered body.

The urethane compound having 6 or more polymerizable functional groups preferably has a weight average molecular weight of 1000 to 10,000. Examples of such urethane compounds having 6 or more polymerizable functional groups include those produced by the Nippon Synthetic Chemical Industry Co., Ltd. such as UV1700B (weight average molecular weight: 2000; the number of polymerizable functional groups: 10), UV6300B (weight average molecular weight: 3700, the number of polymerizable functional groups: 7), and UV7640B (weight average molecular weight of 1500; the number of polymerizable functional groups: 7); those produced by Nippon Kayaku Co., Ltd. such as DPHA40H (weight average molecular weight: 7000; the number of polymerizable functional groups: 8) and UX5001T (weight average molecular weight: 6200; the number of polymerizable functional groups: 8); those produced by Negami Chemical Industrial Co., Ltd. such as UN3320HS (weight average molecular weight of 5000, the number of polymerizable functional groups: 15), UN904 (weight average molecular weight of 4900; the number of polymerizable functional groups: 10), UN3320HC (weight average molecular weight of 1500; the number of polymerizable functional groups: 6), and UN3320HA (weight average molecular weight of 1500; the number of polymerizable functional groups: 6); those produced by Arakawa Chemical Industries, Ltd. such as BS577 (weight average molecular weight 1000; the number of polymerizable functional groups: 6); and those produced by Shin-Nakamura Chemical Co., Ltd. such as U15H (the number of polymerizable functional groups: 15) and U6H (the number of polymerizable functional groups: 6).

Further, the polymer having 10 or more polymerizable functional groups preferably has a weight average molecular weight of 10,000 to 50,000. Examples of such polymers having 10 or more polymerizable functional groups include those produced by Arakawa Chemical Industries, Ltd. such as BS371, BS371MLV, BSDK1, BSDK2, and BSDK3; and those produced by Hitachi Chemical Co., Ltd. such as HITALOID 7975D series (for example, HITALOID 7975D5, 7975D12, 7975D40, etc.).

The weight-average molecular weight can be determined against a polystyrene standard by gel permeation chromatography (GPC).

Preferable examples of the monomers having 2 or more polymerizable functional groups include dipentaerythritol hexaacrylate (DPHA) and pentaerythritol triacrylate (PETA).

The ionizing radiation-curable resin can be used in combination with a solvent drying-type resin (resins such as thermoplastic resins, which can be formed into a coating film simply by drying a solvent added thereto to adjust the solids content during coating). The use of the ionizing radiation-curable resin in combination with a solvent drying-type resin effectively prevents coating defects on a coated surface. No particular limitation is imposed on the solvent drying-type resin used in combination with the ionizing radiation-curable resin. Usually, a thermoplastic resin can be used.

No particular limitation is imposed on the thermoplastic resin. Examples thereof include styrene resins, (meth)acrylic resins, vinyl acetate resins, vinyl ether resins, halogen-containing resins, alicyclic olefin resins, polycarbonate resins, polyester resins, polyamide resins, cellulose resins, silicone resins, and rubbers or elastomers. The above thermoplastic resin is preferably amorphous and soluble inorganic solvents (particularly, common solvents in which multiple polymers and curable compounds can be dissolved). In particular, from the viewpoint of film-forming properties, transparency, and weather resistance, resins such as styrene resins, (meth)acrylic resins, alicyclic olefin resins, polyester resins, and cellulose derivatives (cellulose esters and the like) are preferred.

The hard coat layer-forming composition may also contain a thermosetting resin.

The thermosetting resin is not particularly limited, and examples thereof include phenolic resins, urea resins, diallyl phthalate resins, melamine resins, guanamine resins, unsaturated polyester resins, polyurethane resins, epoxy resins, amino alkyd resins, melamine-urea co-condensed resins, silicon resins, and polysiloxane resins.

A known photopolymerization initiator can be used without any limitation. Specific examples of the photopolymerization initiator include acetophenones, benzophenones, Michler-Benzoyl benzoate, α-amyloxim esters, thioxanthones, propiophenones, benzyls, benzoins, and acylphosphine oxides. The photopolymerization initiator is preferably used by being mixed with a photosensitizer. Specific examples thereof include n-butylamine, triethylamine, and poly-n-butylphosphine.

In the case where the ionizing radiation-curable resin is a resin having a radically polymerizable unsaturated group, the photopolymerization initiator is preferably one or a mixture of acetophenones, benzophenones, thioxanthones, benzoin, benzoin methyl ether, and the like. When the ionizing radiation-curable resin is a resin having a cationically polymerizable functional group, the photopolymerization initiator is preferably one or a mixture of aromatic diazonium salts, aromatic sulfonium salts, aromatic iodonium salts, metallocene compounds, benzoin sulfonic esters, and the like.

Herein, curing of the ionizing radiation-curable resin is preferably carried out by ultraviolet irradiation in $N_2$ atmosphere (the oxygen concentration is preferably 1000 ppm or less, more preferably 500 ppm or less, and still more preferably 250 ppm or less) in view of the hardness of a hard coat layer to be formed. When the ionizing radiation-curable resin is cured in such an atmosphere, the outermost surface of the coating film formed from the hard coat layer-forming composition is easily solidified, and the inside thereof is not easily solidified. However, the Martens hardness values (N1), (N2), and (N3) can be controlled so as to satisfy the above relationship by ensuring that the amount of the photopolymerization initiator is in a specific range, in accordance with the types of the ionizing radiation-curable resin and the solvent.

Specifically, the hard coat layer-forming composition preferably contains the photopolymerization initiator in an amount of 0.75 to 2.5 parts by mass based on 100 parts by mass of the ionizing radiation-curable resin. An amount of less than 0.75 parts by mass may make it impossible to ensure that the Martens hardness (N2) of the hard coat layer of the optical layered body of the present invention is in the above-described range. An amount of more than 2.5 parts by mass may prevent the ionizing radiation from reaching the inner part of the applied coating film, thus failing to facilitate the internal curing and not being able to provide the target pencil hardness of 3H or more to the surface of the hard coat layer. It also results in greater heat generation during curing of the coating film, which facilitates curing of the ionizing radiation-curable resin. Consequently, the resulting optical layered body is more prone to curling and heat wrinkles.

A more preferred lower limit of the amount of the photopolymerization initiator is 1 part by mass, and a more preferred upper limit is 2 parts by mass. Although the reason is unclear, with the amount of the photopolymerization initiator being in the above range, the hardness distribution can be adequately formed in the film thickness direction, and the optical layered body of the present invention can be provided with both high hardness and reduced curling.

The hard coat layer-forming composition may contain a solvent.

A solvent usable as the above solvent is selected depending on the type and the solubility of a resin component to be used. Examples include ketones (such as acetone, methyl ethyl ketone, methyl isobutyl ketone, cyclohexanone, and diacetone alcohol), ethers (such as dioxane, tetrahydrofuran, propylene glycol monomethyl ether, and propylene glycol monomethyl ether acetate), aliphatic hydrocarbons (such as hexane), alicyclic hydrocarbons (such as cyclohexane), aromatic hydrocarbons (such as toluene and xylene), halocarbons (such as dichloromethane and dichloroethane), esters (such as methyl acetate, ethyl acetate, and butyl acetate), alcohols (such as ethanol, isopropanol, butanol, and cyclohexanol), cellosolves (such as methyl cellosolve and ethyl cellosolve), cellosolve acetates, sulfoxides (such as dimethyl sulfoxide), and amides (such as dimethylformamide and dimethylacetamide). Mixed solvents of these solvents may also be used.

It is particularly preferred that the above solvent contain a penetrating solvent that has an ability to penetrate the triacetylcellulose substrate. In the present invention, the meaning of the "ability to penetrate" of the penetrating solvent includes all the concepts such as ability to penetrate, swell, and wet the triacetylcellulose substrate.

Such a penetrating solvent swells or wets the triacetylcellulose substrate, and this allows a portion of the hard coat layer-forming composition to penetrate the triacetylcellulose substrate.

Specific examples of the penetrating solvent include ketones such as acetone, methyl ethyl ketone, cyclohexanone, methyl isobutyl ketone, diacetone alcohol; esters such as methyl formate, methyl acetate, ethyl acetate, butyl acetate, and ethyl lactate; nitrogen-containing compounds such as nitromethane, acetonitrile, N-methylpyrrolidone, and N,N-dimethylformamide; glycols such as methylglycol and methylglycol acetate; ethers such as tetrahydrofuran, 1,4-dioxane, dioxolan, and diisopropylether; halogenated hydrocarbons such as methylene chloride, chloroform, and tetrachloroethane; glycol ethers such as methyl cellosolve, ethyl cellosolve, butyl cellosolve, cellosolve acetate; dimethyl sulfoxide; and propylene carbonate. Mixtures of these solvents are also included. Preferred among the above are esters and ketones, such as methyl acetate, ethyl acetate, butyl acetate, and methyl ethyl ketone. In addition, alcohols such as methanol, ethanol, isopropyl alcohol, butanol, and isobutyl alcohol, and aromatic hydrocarbons such as toluene and xylene can also be used by being mixed with the penetrating solvent.

Further, the amount of the penetrating solvent in the hard coat layer-forming composition is preferably 10 to 100% by mass, particularly 50 to 100% by mass, based on the total solvent weight.

The percentage of dissolved raw materials (solids content) in the hard coat layer-forming composition is not particularly limited. The percentage is usually 5 to 70% by mass, with 25 to 60% by mass being particularly preferred.

According to the purposes such as increasing the hardness of the hard coat layer, suppressing cross-linked curing shrinkage, controlling the refractive index, and providing anti-glare properties, the hard coat layer-forming composition may be mixed with conventionally known additives such as dispersants, surfactants, antistatic agents, silane coupling agents, thickeners, anti-coloring agents, colorants (pigments and dyes), defoamers, leveling agents, flame retardants, ultraviolet absorbers, tackifiers, polymerization inhibitors, antioxidants, surface modifiers, and lubricants.

The hard coat layer-forming composition may also be mixed with a photosensitizer. Specific examples thereof include n-butylamine, triethylamine, and poly-n-butylphosphine.

A method for preparing the hard coat layer-forming composition is not particularly limited as long as the components are uniformly mixed. For example, a known device such as a paint shaker, a bead mill, a kneader, or a mixer can be used.

Examples of the method for forming a hard coat layer having the Martens hardness (N1) and the Martens hardness (N2) using the hard coat layer-forming composition include a method in which a coating film formed by applying the hard coat layer-forming composition to a triacetylcellulose substrate is cured under predetermined conditions.

The method for applying the hard coat layer-forming composition on the triacetylcellulose substrate is not particularly limited. Examples include publicly known methods such as a spin coating method, a dipping method, a spraying method, a die coating method, a bar coating method, a roll coater method, a meniscus coater method, a flexo-printing method, a screen printing method, and a bead coater method.

The coating film formed by applying the hard coat layer-forming composition to the triacetylcellulose substrate is preferably heated and/or dried, if necessary, and cured by irradiation of active energy rays or the like.

The irradiation of active energy rays includes, for example, irradiation of ultraviolet light or electron beam. Specific examples of sources of ultraviolet light include light sources such as super-high pressure mercury vapor lamp, high pressure mercury vapor lamp, low pressure mercury vapor lamp, carbon arc lamp, black light fluorescent lamp, and metal halide lamp. An ultraviolet light having a wavelength of 190 to 380 nm can be used. Specific examples of electron beam sources include electron beam accelerators of various types such as Cockcroft-Walton type, Van de Graaff type, resonance transformation type, insulation core transformer type, linear type, dynamitron type, and high-frequency type.

The optical layered body of the present invention preferably has a total light transmission of 85% or more. A total light transmission of less than 85% may result in poor color reproducibility and visibility in the case where the optical layered body of the present invention is mounted on the surface of an image display device. The total light transmission is preferably 90% or more, and more preferably 92% or more.

The optical layered body of the present invention preferably has a haze of less than 1%, more preferably less than 0.5%. Further, when the optical layered body of the present invention is provided with anti-glare properties as in the case where a known anti-glare layer (described later) is formed, the haze is preferably less than 80%. The anti-glare layer creates haze due to internal scattering and/or haze due to roughness of the outermost surface. The haze due to internal scattering is preferably 0.5% or more to less than 79%, more preferably 1% or more to less than 50%. The haze on the outermost surface is preferably 0.5% or more to less than 35%, more preferably 1% or more to less than 20%, and still more preferably 1% or more to less than 10%.

The optical layered body of the present invention may be suitably formed with one or two or more other layers (such as an anti-glare layer, an antistatic layer, a low refractive index layer, an antifouling layer, an adhesive layer, and another hard coat layer) if necessary, as long as the effects of the present invention are not impaired. In particular, it is preferred that at least one layer from an anti-glare layer, an antistatic layer, a low refractive index layer, and an antifouling layer be provided to the optical layered body. These layers may be the same as those used for known antireflection layered bodies.

The optical layered body of the present invention can be manufactured by forming a hard coat layer on a triacetylcellulose substrate using the hard coat layer-forming composition containing an ionizing radiation-curable resin and a photopolymerization initiator.

The hard coat layer-forming composition and the hard coat layer may be formed using the same materials by the same methods as described for the above hard coat layer.

The optical layered body of the present invention can be formed into a polarizer by arranging the optical layered body of the present invention on the surface of a polarizing element, on the side opposite where the hard coat layer is present. Such a polarizer is also an aspect of the present invention.

The polarizing element is not particularly limited. For example, polyvinyl alcohol film, polyvinyl formal film, polyvinyl acetal film, ethylene-vinyl acetate copolymer-based saponified film, or the like which have been dyed with iodine or the like, and stretched can be used. In lamination of the polarizing element and the optical layered body of the present invention, the light transmissive substrate (triacetylcellulose film) is preferably saponified. A good adhesion and an antistatic effect can be obtained by saponification treatment.

Another aspect of the present invention is an image display device including the optical layered body or the polarizer on the outermost surface thereof.

The image display device may be, for example, an LCD, a PDP, an FED, an ELD (organic EL or inorganic EL), a CRT, a touch panel, an electronic paper, or a tablet PC.

The LCD, which is a typical example of the image display device, includes a transmissive display and a light source device that irradiates the transmissive display from behind. When the image display device of the present invention is an LCD, the optical layered body of the present invention or the polarizer of the present invention is formed on the surface of the transmissive display; or the optical layered body is provided on the surface (it may be a surface on the BL side) of a front glass substrate (also referred to as "front plate") that is located closer to the viewing side than the LCD polarizer is.

When the present invention is a liquid crystal display device having the optical layered body, the optical layered body is irradiated from below with a light source of the light source device. In the case of, for example, an STN, VA, or IPS liquid crystal display device, a retarder may be inserted between the liquid crystal display element and the polarizer. An adhesive layer may be provided, if necessary, between each layer of the liquid crystal display device.

The PDP as the image display device includes a front glass substrate (in which electrodes are formed on the surface) and a rear glass substrate (in which electrodes and microscopic grooves are formed on the surface, and red, green, and blue phosphor layers are formed in the grooves) disposed to face the front glass substrate, with a discharge gas enclosed between these substrates. When the image display device of the present invention is a PDP, the PDP includes the optical layered body disposed on the surface of the front glass substrate or a front plate (a glass substrate or a film substrate) thereof.

The image display device may be, for example, an ELD apparatus in which phosphors such as zinc sulfide or diamines|$_{[F1]}$, which emit light when a voltage is applied thereto, are deposited on a glass substrate, and the voltage to be applied to the substrate is controlled to perform display; or a CRT that converts electrical signals into light and produces images visible to human eyes. In this case, each image display device includes the above-described optical layered body on the outermost surface of such a display device as described above, or on the surface of a front plate of the display device.

In any of the cases, the image display device of the present invention can be used for displays such as televisions, computers, and word processors. In particular, the image display device can be suitably used in the surface of displays for high-definition images, such as CRTs, liquid crystal panels, PDPs, ELDs, FEDs, touch panels, electronic paper, and tablet PCs.

Advantageous Effects of Invention

Because the optical layered body of the present invention is configured as described above, the occurrence of curling can be suitably prevented. Thus, the optical layered body of the present invention is suitably applicable to cathode-ray tube (CRT) display devices, liquid crystal displays (LCDs), plasma display panels (PDPs), electroluminescence displays (ELDs), field emission displays (FEDs), touch panels, electronic paper, tablet PCs, and the like.

BRIEF DESCRIPTION OF DRAWINGS

FIG. 3 is a schematic diagram of an image display device wherein 15 represents a polarizer, 10 represents the hard coat layer; 11 represents the triacetylcellulose substrate and 16 represents an image display device.

DESCRIPTION OF EMBODIMENTS

Figure 1:
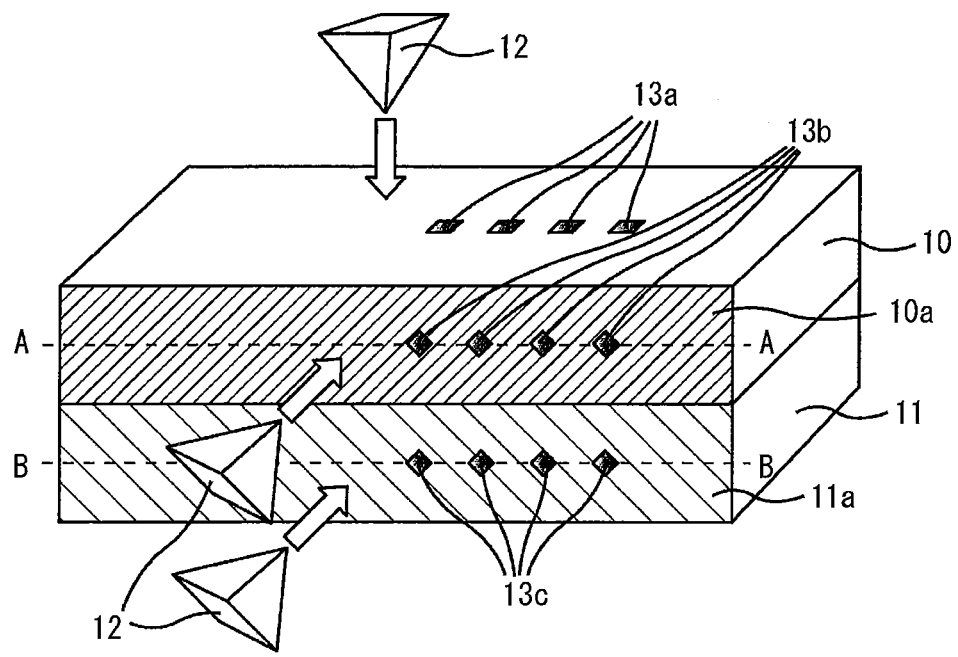
FIG. 1 is a schematic diagram for describing a method for measuring the Martens hardness.

The present invention is described with reference to the following examples; however, interpretation of the present invention should not be limited to these examples.

Additionally, "parts" and "%" are mass basis unless otherwise specified.

A hard coat layer-forming composition 1 was prepared by the following formulation.
<Hard Coat Layer-Forming Composition 1>
  Resin 1; pentaerythritol triacrylate (produced by Nippon Kayaku Co., Ltd.; PET30), 20 parts by mass
  Resin 2: polymer acrylate (B-1), 30 parts by mass
  Polymerization initiator; Irg. 184 (produced by Chiba Japan Co., Ltd.; Irgacure 184), 1 part by mass
  Irg. 907 (produced by Chiba Japan Co., Ltd.; Irgacure 907), 1 part by mass
  Leveling agent; Megafac MCF 350-5, 0.05 parts by mass
  Solvent; methyl ethyl ketone (MEK), 50 parts by mass
  Herein, a polymer acrylate (B-1) is "BS371MLV" produced by Arakawa Chemical Industries, Ltd., and has about 25 acryloyl groups per molecule and an average molecular weight (Mw) of 15000.

Hard coat layer-forming compositions 2 to 17 were prepared in accordance with the formulation shown in Table 1.

In Table 1,
"UV1700B" indicates a multifunctional urethane acrylate (produced by the Nippon Synthetic Chemical Industry Co., Ltd.; UV1700B; the number of polymerizable functional groups: 10), "A-1" indicates reactive irregularly shaped silica fine particles having an average secondary particle size of 100 nm, in which four spherical silica fine particles having an average primary particle size of 30 nm are bonded to each other by an inorganic chemical bond; and are diluted with MIBK to a solids content of 40%.

"BS577" indicates a urethane acrylate resin (the number of polymerizable functional groups: 6) produced by Arakawa Chemical Industries, Ltd.

"B-2" indicates "BS371" produced by Arakawa Chemical Industries, Ltd., having about 50 acryloyl groups per molecule and an average molecular weight (Mw) of 40000.

TABLE 1

| | Resin 1 | | Resin 2 | | Silica fine particles | | Polymerization initiator | | Leveling agent | | Solvent | |
|---|---|---|---|---|---|---|---|---|---|---|---|---|
| | Type | Parts by mass | Type | Parts by mass | Type | Parts by mass | Type | Parts by mass | Type | Parts by mass | Type | Parts by mass |
| Hard coat layer-forming composition 1 | PETA | 20 | B-1 | 30 | — | — | Irg.184 Irg.907 | 1 1 | MCF350-5 | 0.05 | MEK | 50 |
| Hard coat layer-forming composition 2 | PETA | 20 | UV1700B | 30 | — | — | Irg.184 | 2 | MCF350-5 | 0.05 | MEK | 50 |
| Hard coat layer-forming composition 3 | PETA | 30 | BS577 | 20 | — | — | Irg.184 | 1 | MCF350-5 | 0.05 | MIBK | 50 |
| Hard coat layer-forming composition 4 | PETA | 20 | BS577 | 30 | — | — | Irg.184 | 1 | MCF350-5 | 0.05 | MIBK | 50 |
| Hard coat layer-forming composition 5 | PETA | 20 | B-2 | 30 | — | — | Irg.184 Irg.907 | 1 1 | MCF350-5 | 0.05 | MEK | 50 |
| Hard coat layer-forming composition 6 | PETA | 30 | B-1 | 20 | — | — | Irg.184 Irg.907 | 1 1 | MCF350-5 | 0.05 | MEK | 50 |
| Hard coat layer-forming composition 7 | PETA | 35 | B-1 | 15 | — | — | Irg.184 | 2 | MCF350-5 | 0.05 | MIBK | 50 |
| Hard coat layer-forming composition 8 | PETA | 15 | UV1700B | 35 | — | — | Irg.184 | 2 | MCF350-5 | 0.05 | MIBK | 50 |
| Hard coat layer-forming composition 9 | PETA | 15 | UV1700B | 35 | — | — | Irg.184 | 1 | MCF350-5 | 0.05 | MEK | 50 |
| Hard coat layer-forming composition 10 | DPHA | 30 | — | — | A-1 | 20 | Irg.184 | 2 | MCF350-5 | 0.05 | MEK | 50 |
| Hard coat layer-forming composition 11 | PETA | 50 | — | — | — | — | Irg.184 | 2 | MCF350-5 | 0.05 | MIBK | 50 |
| Hard coat layer-forming composition 12 | DPHA | 50 | — | — | — | — | Irg.184 | 2 | MCF350-5 | 0.05 | MIBK | 50 |
| Hard coat layer-forming composition 13 | PETA | 20 | UV1700B | 30 | — | — | Irg.184 Irg.907 | 3 3 | MCF350-5 | 0.05 | MEK | 50 |
| Hard coat layer-forming composition 14 | PETA | 10 | UV1700B | 40 | — | — | Irg.184 | 0.25 | MCF350-5 | 0.05 | MEK | 50 |
| Hard coat layer-forming composition 15 | DPHA | 20 | — | — | A-1 | 30 | Irg.184 | 2 | MCF350-5 | 0.05 | MEK | 50 |
| Hard coat layer-forming composition 16 | DPHA | 50 | — | — | — | — | Irg.184 | 3 | MCF350-5 | 0.05 | MEK | 50 |
| Hard coat layer-forming composition 17 | PETA | 15 | UV1700B | 35 | — | — | Irg.184 | 0.5 | MCF350-5 | 0.05 | MEK | 50 |

Example 1

Production of the Optical Layered Body

A triacetylcellulose substrate (thickness of 40 μm, produced by Konica Minolta Holdings, Inc.; KC4UA) was provided, and a hard coat layer-forming composition 1 was applied to one side of the triacetylcellulose substrate. The thus-obtained coating film was dried in a thermal oven at 70° C. for 60 seconds to evaporate the solvent in the coating film, and irradiated with ultraviolet light to a cumulative amount of light of 100 mJ/cm$^2$ to cure the coating film. Thereby, a hard coat layer of 10 g/cm$^2$ (dry basis) was formed. In this way, an optical layered body having a triacetylcellulose substrate and a hard coat layer was produced.

Examples 2 to 9, Comparative Examples 1 to 6, 8, and 9

Optical layered bodies of Examples 2 to 9 and Comparative Examples 1 to 6, 8, and 9 were produced by the same preparation method as in Example 1, except that hard coat layer-forming compositions 2 to 17 were used instead of the hard coat layer-forming composition 1, as shown in Table 2.

Comparative Example 7

An optical layered body of Comparative Example 7 was produced in the same manner as in Example 1, except that the coating film was irradiated with ultraviolet light to a cumulative amount of light of 50 mJ/cm$^2$.

Comparative Example 10

An optical layered body of Comparative Example 10 was produced in the same manner as in Example 1, except that the coating film was irradiated with ultraviolet light from the substrate side to a cumulative amount of light of 100 mJ/cm$^2$ during formation of a hard coat layer.

The optical layered bodies obtained in Examples and Comparative Examples were evaluated by the following methods. Table 2 shows the results.

(Evaluation 1: Measurement of Martens Hardness)

The optical layered bodies of Examples and Comparative Examples were subjected to measurement of Martens hardness by nanoindentation using Picodentor HM-500 produced by Fischer Instruments K.K. The measurement was performed on the surface of each hard coat layer, the center of the cross-section thereof, and the center of the cross-section of each triacetylcellulose substrate, and these measured values were respectively regarded as N1, N2, and N3.

With an applied load of 10 mN, the average of measurements at five points performed on the surface of the hard coat layer was regarded as N1 (N/mm$^2$).

Further, the optical layered bodies of Examples and Comparative Examples were cut into 50 μm-pieces. With an applied load of 10 mN, the average of measurements at five points performed on the substantially center of the cross-section of the hard coat layer was regarded as N2, and the average of measurements at five points performed on the substantially center of the cross-section of the triacetylcellulose substrate was regarded as N3. A specific measurement method of Martens hardness is as described above using FIG. 1. Conditions of an indenter tip, indentation rate, and indentation load of the Picodentor, and the temperature and humidity during measurement were set as follows.

Vickers indenter (square-based pyramid), angle of 136 degrees between the opposite faces at the apex

| 0 mN to 10 mN | 10 seconds |
| maintained at 10 mN | 5 seconds |
| 10 mN to 0 mN | 10 seconds |

Temperature of 25° C. and humidity of 50%
(Evaluation 2: Pencil Hardness)

The optical layered bodies of Examples and Comparative Examples were conditioned at a temperature of 23° C. and a relative humidity of 50% for 16 hours or more. Subsequently, a pencil hardness test was performed at a load of 4.9 N and a scratch rate of 1.4 mm/sec, partially in accordance with a pencil hardness evaluation method specified in JIS K5600-5-4 (1999), using a test pencil (hardness 3H) specified in JIS S-6006. Results were evaluated based on the following criteria.
(Evaluation Criteria)

A scratch test was performed five times. When the scratch left a mark having a length equal to or longer than ⅓ of the distance of the scratch and when such a scratch mark was visible under sufficiently bright fluorescent light, the result was regarded as unsatisfactory. A hard coat layer with one or no unsatisfactory results out of five tests was regarded as having passed the pencil hardness test (good), and a hard coat layer with two or more such scratch marks was regarded as having failed the pencil hardness test (poor).
(Evaluation 3: Abrasion Resistance)

The surface of the hard coat layer of each optical layered body of Examples and Comparative Examples was rubbed 10 times back and forth using #0000 steel wool at various friction loads. Subsequently, damage and peeling of the coating film were visually checked, and the results were evaluated based on the following criteria.

Excellent: neither damage nor peeling of the coating film occurred at a load of 1000 g/cm².

Good: neither damage nor peeling of the coating film occurred at a load of 700 g/cm² (some damage or peeling of the coating film occurred at a load of 1000 g/cm²).

Poor: damage or peeling of the coating film occurred at a load of 700 g/cm².
(Evaluation 4: Flexibility)

In accordance with a mandrel test (a test in which samples are wrapped around metal cylinders with a diameter of 2 mm to 32 mm) described in JIS K5600-5-1, each optical layered body of Examples and Comparative Examples was longitudinally wrapped around a cylinder in such a manner that the hard coat layer faces outside, and a minimum diameter of a cylinder with which cracking did not occur was recorded. Specifically, in the case where cracking occurred with a cylinder having a diameter of 15 mm and no cracking occurred with a cylinder having a diameter of 16 mm, 16 mm was recorded as a minimum diameter. An optical layered body that did not crack at a diameter of 17 mm or less was evaluated as a good optical layered body.
(Evaluation 5: Curl Width)

Figure 2:
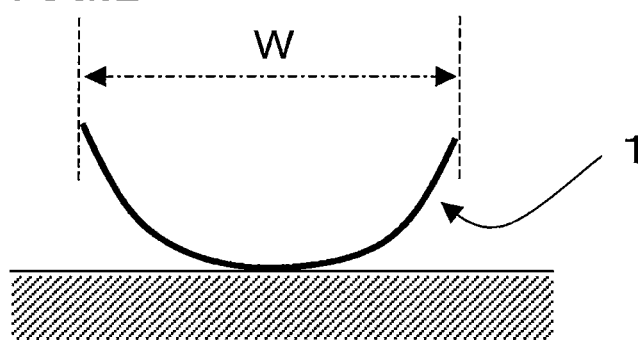
FIG. 2 is a schematic diagram for describing a method for measuring the curl width.

For the degree of curling (curl width) of the optical layered body, the optical layered bodies of Examples and Comparative Examples were cut into sample pieces of 10 cm×10 cm, and a sample piece 1 was placed on a horizontal table (flat surface) to measure a distance (W) between the end points of the hard coat layer, as shown in FIG. 2. The average distance (mm) was evaluated as follows:

Good: 40 mm or more
Acceptable: 20 or more to less than 40 mm
Poor: 0 or more to less than 20 mm
(Evaluation 6: Heat Wrinkles)

The optical layered bodies of Examples and Comparative Examples were cut into sample pieces of 100 cm×50 cm, and each sample piece was placed on a black horizontal table (flat surface). The reflection of a fluorescent light arranged 1 m above the sample was visually observed at a position 45 degrees from the sample surface, and evaluated based on the following criteria.

Good: hardly any heat wrinkles were observed.
Acceptable: heat wrinkles were moderately observed.
Poor: heat wrinkles were remarkably observed.

TABLE 2

| | Hard coat layer-forming composition | N1 (N/mm²) | N2 (N/mm²) | N3 (N/mm²) | Pencil hardness 3H | Abrasion resistance | Flexibility (mm) | Curling (mm) | Heat wrinkles |
|---|---|---|---|---|---|---|---|---|---|
| Example 1 | Hard coat layer-forming composition 1 | 249 | 229 | 203 | Good | Excellent | 16 | Good | Good |
| Example 2 | Hard coat layer-forming composition 2 | 248 | 230 | 193 | Good | Excellent | 15 | Good | Good |
| Example 3 | Hard coat layer-forming composition 3 | 240 | 217 | 188 | Good | Excellent | 16 | Good | Good |
| Example 4 | Hard coat layer-forming composition 4 | 219 | 206 | 176 | Good | Good | 16 | Good | Good |
| Example 5 | Hard coat layer-forming composition 5 | 250 | 235 | 201 | Good | Excellent | 16 | Good | Good |
| Example 6 | Hard coat layer-forming composition 6 | 273 | 265 | 210 | Good | Excellent | 17 | Acceptable | Acceptable |
| Example 7 | Hard coat layer-forming composition 7 | 336 | 283 | 231 | Good | Excellent | 17 | Acceptable | Acceptable |
| Example 8 | Hard coat layer-forming composition 8 | 217 | 160 | 155 | Good | Good | 15 | Good | Good |
| Example 9 | Hard coat layer-forming composition 9 | 210 | 142 | 152 | Good | Good | 15 | Good | Good |
| Comparative Example 1 | Hard coat layer-forming composition 10 | 448 | 621 | 320 | Good | Excellent | 20 | Acceptable | Acceptable |
| Comparative Example 2 | Hard coat layer-forming composition 11 | 407 | 322 | 342 | Good | Excellent | 19 | Poor | Poor |

TABLE 2-continued

| | Hard coat layer-forming composition | N1 (N/mm$^2$) | N2 (N/mm$^2$) | N3 (N/mm$^2$) | Pencil hardness 3H | Abrasion resistance | Flexibility (mm) | Curling (mm) | Heat wrinkles |
|---|---|---|---|---|---|---|---|---|---|
| Comparative Example 3 | Hard coat layer-forming composition 12 | 446 | 330 | 301 | Good | Excellent | 20 | Poor | Poor |
| Comparative Example 4 | Hard coat layer-forming composition 13 | 451 | 460 | 322 | Poor | Excellent | 20 | Poor | Poor |
| Comparative Example 5 | Hard coat layer-forming composition 14 | 198 | 175 | 183 | Poor | Poor | 17 | Good | Good |
| Comparative Example 6 | Hard coat layer-forming composition 15 | 450 | 625 | 244 | Good | Excellent | 21 | Poor | Poor |
| Comparative Example 7 | Hard coat layer-forming composition 1 | 249 | 199 | 141 | Poor | Excellent | 16 | Good | Good |
| Comparative Example 8 | Hard coat layer-forming composition 16 | 478 | 298 | 150 | Poor | Excellent | 21 | Poor | Poor |
| Comparative Example 9 | Hard coat layer-forming composition 17 | 200 | 98 | 150 | Poor | Good | 15 | Acceptable | Acceptable |
| Comparative Example 10 | Hard coat layer-forming composition 18 | 241 | 264 | 150 | Good | Good | 20 | Acceptable | Acceptable |

As shown in Table 2, the optical layered bodies of Examples 1 to 9 showed sufficient suppression of the occurrence of curling, and had good results on the 3H pencil hardness test. These products were also excellent in the abrasion resistance, and were well evaluated in terms of flexibility and curling.

In contrast, the optical layered bodies of Comparative Examples 1 to 4, 6, and 8 showed good results on the 3H pencil hardness test and/or abrasion resistance, but had a poor result on the flexibility, and the occurrence of curling was remarkably observed. The optical layered bodies of Comparative Examples 5, 7, and 9 were well evaluated in terms of flexibility and curling, but did not reach a hardness of 3H in the pencil hardness test, and were poorly evaluated in terms of abrasion resistance. The optical layered body of Comparative Example 10 had good results on the 3H pencil hardness test and the abrasion resistance, but were poorly evaluated in terms of flexibility.

INDUSTRIAL APPLICABILITY

The optical layered body of the present invention is suitably applicable to cathode-ray tube (CRT) display devices, liquid crystal displays (LCDs), plasma display panels (PDPs), electroluminescence displays (ELDs), field emission displays (FEDs), and the like.

REFERENCE SIGNS LIST 1 sample piece
10 hard coat layer
10a cross-section
11 triacetylcellulose substrate
11a cross-section
12 Vickers indenter
13a, 13b, 13c depressions

The invention claimed is:

1. An optical layered body comprising a hard coat layer formed on one side of a triacetylcellulose substrate, wherein the triacetylcellulose substrate has a thickness of 10 to 65 µm,
wherein the hard coat layer has a single-layered structure, and
a Martens hardness (N1) of a surface of the hard coat layer, a Martens hardness (N2) of the center of the cross-section of the hard coat layer, and a Martens hardness (N3) of the center of the cross-section of the triacetylcellulose substrate as measured by nanoindentation at a load of 10 mN are as follows:
the Martens hardness (N1) is 200 to 450 N/mm$^2$,
the Martens hardness (N2) is 150 to 300 N/mm$^2$, and
the Martens hardness (N3) is 100 to 250 N/mm$^2$.

2. The optical layered body according to claim 1, wherein the difference (N1−N2) between the Martens hardness (N1) and the Martens hardness (N2) is 0 to 150 N/mm$^2$, and the difference (N2−N3) between the Martens hardness (N2) and the Martens hardness (N3) is 0 to 150 N/mm$^2$.

3. The optical layered body according to claim 2, wherein the hardness of the surface of the hard coat layer as determined by a pencil hardness test (load of 4.9 N) is 3H or more.

4. The optical layered body according to claim 2, wherein the hard coat layer is formed using a hard coat layer-forming composition containing an ionizing radiation-curable resin and a photopolymerization initiator, and the ionizing radiation-curable resin contains a urethane compound having 6 or more polymerizable functional groups or a polymer having 10 or more polymerizable functional groups, and a monomer having 2 or more polymerizable functional groups.

5. The optical layered body according to claim 4, wherein the hard coat layer-forming composition contains the photopolymerization initiator in an amount of 0.75 to 2.5 parts by mass based on 100 parts by mass of the ionizing radiation-curable resin.

6. A polarizer comprising a polarizing element and the optical layered body according to claim 2 which is arranged on a surface of the polarizing element.

7. An image display device comprising the optical layered body according to claim 2.

8. The optical layered body according to claim 1, wherein the hardness of the surface of the hard coat layer as determined by a pencil hardness test is 3H or more, with a load of 4.9 N.

9. The optical layered body according to claim 8, wherein the hard coat layer is formed using a hard coat layer-forming composition containing an ionizing radiation-curable resin and a photopolymerization initiator, and the ionizing radiation-curable resin contains a urethane compound having 6 or more polymerizable functional groups or a polymer having 10 or more polymerizable functional groups, and a monomer having 2 or more polymerizable functional groups.

10. A polarizer comprising a polarizing element and the optical layered body according to claim 8 which is arranged on a surface of the polarizing element.

11. An image display device comprising the optical layered body according to claim 8.

12. The optical layered body according to claim 1,
wherein the hard coat layer is formed using a hard coat layer-forming composition containing an ionizing radiation-curable resin and a photopolymerization initiator, and
the ionizing radiation-curable resin contains a urethane compound having 6 or more polymerizable functional groups or a polymer having 10 or more polymerizable functional groups, and a monomer having 2 or more polymerizable functional groups.

13. The optical layered body according to claim 12,
wherein the hard coat layer-forming composition contains the photopolymerization initiator in an amount of 0.75 to 2.5 parts by mass based on 100 parts by mass of the ionizing radiation-curable resin.

14. A polarizer comprising a polarizing element and the optical layered body according to claim 13 which is arranged on a surface of the polarizing element.

15. An image display device comprising the optical layered body according to claim 13.

16. A polarizer comprising a polarizing element and the optical layered body according to claim 12 which is arranged on a surface of the polarizing element.

17. An image display device comprising the optical layered body according to claim 12.

18. A polarizer comprising
a polarizing element and
the optical layered body according to claim 1, which is arranged on a surface of the polarizing element.

19. An image display device comprising the polarizer according to claim 18 on an outermost surface thereof.

20. An image display device comprising
the optical layered body according to claim 1.

* * * * *